O. T. EARLE,

Assignor of one-half interest to J. H. HUBBELL, said EARLE & HUBBELL assignors to F. F. RAYMOND, 2d Trustee.

Clamps for Hose-Couplings.

No. 9,041. Reissued Jan. 13, 1880.

WITNESSES

Wm. A. Skinkle.

Wm. F. Kilgrove

INVENTOR

Oscar T. Earle.

By his Attorneys

Clarke & Raymond.

UNITED STATES PATENT OFFICE.

OSCAR T. EARLE, OF MILFORD, CONN., ASSIGNOR OF ONE-HALF INTEREST TO JOHN H. HUBBELL, OF BOSTON; SAID EARLE AND HUBBELL ASSIGNORS TO F. F. RAYMOND, 2D, TRUSTEE, OF NEWTON, MASS.

CLAMP FOR HOSE-COUPLINGS.

SPECIFICATION forming part of Reissued Letters Patent No. 9,041, dated January 13, 1880.

Original No. 172,982, dated February 1, 1876. Application for Reissue filed November 28, 1879.

*To all whom it may concern:*

Be it known that I, OSCAR T. EARLE, of Milford, in the county of New Haven and State of Connecticut, have invented certain new and useful Improvements in Clamps for Hose-Couplings; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

This invention relates to hose-coupling clamps or fastenings, not of the common kind known as "hose-couplings," but to a new and useful device whereby hose may be coupled to the couplings proper, and also breakages may be repaired and extensions made in an easy, simple, and durable manner with an ordinary blacksmith's pinchers, or pipe-tongs or pliers commonly used by gas-fitters; and it consists in punching or stamping out of sheet metal in one piece a strip of sufficient length to encompass any of the various size hose in common use; and it also consists in forming a tongue or projection at one end of said strip, which will be inserted at corresponding apertures formed in the other or opposite end of the same, by which the two ends are interlocked or interlaced with each other, so as to obtain great lateral strength and rigidity and power of resistance, and, by means of suitable clamps formed of jaws and springs, they may be united and held firmly in position, which will be hereinafter more fully described.

It is well known that many attempts have been made in this direction, the devices being principally constructed of cast metal, and some have been forged out of wrought-iron; but, as far as I am aware, none have been successful. The efforts heretofore made have failed principally for lack of flexibility and capacity in the devices to fit the varying thickness of the hose of the different makers.

It may be said, and proved by actual experience, that these clamps will hold or fasten firmly together, on the same thimble or coupling, hose varying in thickness from one to four ply, using the one-sized clamp.

Figure 8:
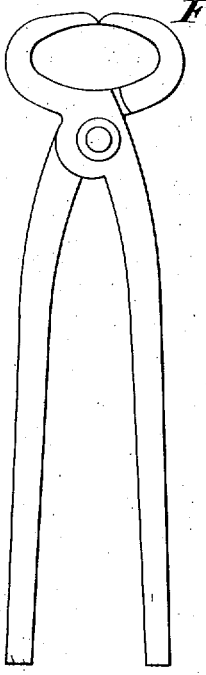
Figure 1:
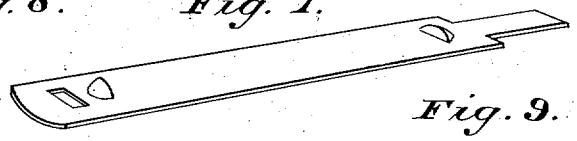
Figure 9:
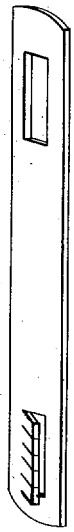
Figure 2:
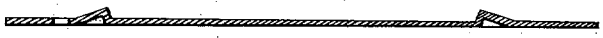
Figure 3:
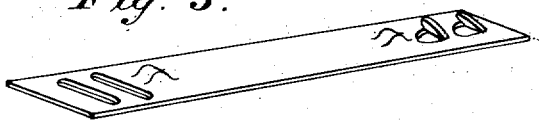
Figure 4:
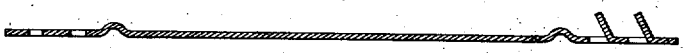
Figure 7:
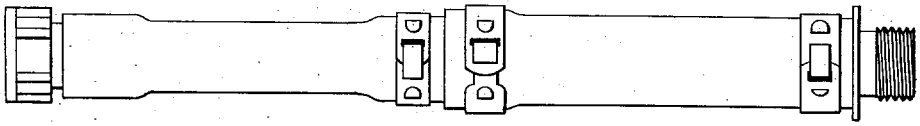
Figure 5:
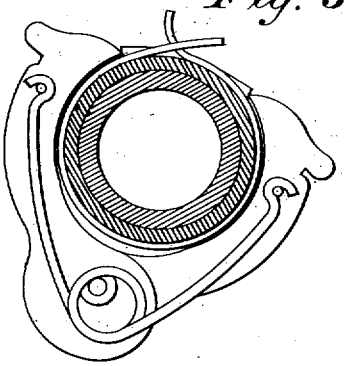
Figure 6:
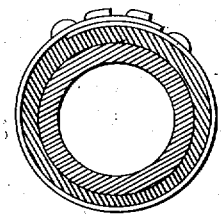

Referring to the drawings, Figure 1 represents a perspective view of a single band or strip provided with one aperture and a corresponding tongue, and having projecting lugs or bosses for receiving the gripe of the pinchers, tongs, or vise to force the strip to a proper position around the hose. Fig. 2 is a longitudinal section through the center of the same. Fig. 3 is a perspective view of a strip before bending into place, showing perforations, lugs, and corresponding projections for use on regular and uniform sized hose, and which may be made with two or more projections or fastenings, as may be desired. Fig. 4 is a longitudinal section of Fig. 3. Fig. 5 represents a cross-section of the fastening before being clinched into position; also, a cross-section of hose and hose-coupling, with the jaws or clamps I prefer to use for securing the fastenings, the spring serving to open or withdraw the clamp when the joint is finished. Either the tongs or pinchers before alluded to may be used instead. Fig. 6 represents an edge view of Figs. 3 and 4, with a cross-section of hose and hose-coupling with the fastenings clinched down complete for use. Fig. 7 shows a plan of hose-pipes, couplings, and fastenings, all completely coupled ready for use, one end of said hose representing a small section, while the other represents a larger one; and it will be seen that at the middle of the hose the thimble used to join them together with is the same diameter its entire length, while the same size fastening or clamp is used for both ends, thus showing that these fastenings are capable of taking up hose of variable sizes and in this manner.

The tongues of the band are of such length that it is adjustable to any size within its range, and thus compensate for variation in the sizes of hose.

It will be observed that this method is simple and cheap, and easily manipulated by any person of ordinary capacity.

It will also be observed in steam and air brakes, fire-hose, &c., that great danger is caused by the breakage, bursting, or fracturing of the hose or connections, and exceedingly great losses of both property and life often result from being unable to repair them in a short space of time. Thus will be seen the importance of this invention, and in what way the dangers and losses above enumerated can be avoided.

The locking or interlacing device may be made in many different forms and modifications; but I do not confine myself to any particular form that may be stamped out of sheet metal in one piece, but claim a sheet-metal hose-clamp or fastening stamped or punched by any well-known method or design by which a sheet-metal strip or fastening is formed for hose-coupling.

Having thus fully described my invention, what I claim, and desire to secure by Letters Patent, is—

1. A strip or band forming a clamp or fastening for hose stamped or punched out of sheet metal in one piece, having perforations and corresponding tongues or projections, substantially as set forth and described.

2. A strap or band forming a clamp or fastening to unite a flexible hose to the inflexible and incompressible hollow core, which constitutes one member of the joint of hose, adapted to be strained longitudinally around the flexible hose and compress the same upon the hollow metallic core by direct draft upon and uniting the ends of said band at any degree of tension desired at the time, substantially as and for the purposes described.

3. The combination, for hose-coupling, of the hollow metallic core, adapted to be united in the usual method to its counterpart upon the adjacent piece of hose, the flexible hose enveloping and slipped over said hollow metallic core, and the single fastening-strip drawn tightly over the same and fastened end to end at any degree of tension desired at the time, substantially as described.

4. As a means of compressing the flexible pipe for a hose upon its end coupling, a single flexible metallic band bent around the exterior of said hose, tightly drawn to compress the same upon the neck of the coupling, and united together end to end at any degree of tension desired at the time, substantially as described.

5. The combination of a flexible hose, a hollow tube or coupling, and a metallic band wrapped around the hose and fastened end to end, under pressure, by a looping-piece or tongue passed through a hole in the end of the band and clinched, substantially as described.

6. The combination of a flexible hose, a hollow tube or coupling, and a flexible metallic band wrapped around the hose, compressing it upon the tube or coupling under pressure, and having its ends clasped together by passing one end through the other and clinching it, substantially as described.

7. A metallic strap or fastening for clamping hose and the like to couplings, tubes, or thimbles, punched, stamped, or formed from any flexible metal, and provided with openings in one end for receiving a looping-piece or tongue of metal, of less width than the main part of said strap, the whole adapted to be drawn tightly around said hose, tube, or thimble, and the looping-piece firmly clinched in place, uniting the said ends, substantially as set forth.

OSCAR T. EARLE.

Witnesses:
WM. A. SKINKLE,
F. F. RAYMOND, 2d.